INVENTORS: A. ASHKIN
A. YARIV

ATTORNEY

United States Patent Office 3,126,485
Patented Mar. 24, 1964

3,126,485
MODULATOR FOR OPTICAL MASERS
Arthur Ashkin, Bernardsville, and Amnon Yariv, Chatham, N.J., assignors to Bell Telephone Laboratories, Incorporated, New York, N.Y., a corporation of New York
Filed Oct. 2, 1961, Ser. No. 142,243
6 Claims. (Cl. 250—199)

This invention relates to optical masers and more particularly to apparatus for modulating the output of optical masers in accordance with signal information.

The recent development of optical masers of the type disclosed in U.S. Patent 2,929,922 to Schawlow and Townes and in patent application Serial No. 816,276 of A. Javan, filed May 27, 1959, has greatly extended the portion of the electromagnetic spectrum which is available for communications purposes. Electromagnetic waves in the optical portion of the spectrum are characterized by extremely high frequencies and hence are capable of transmitting enormous amounts of information. In order to realize the full potential of optical masers in communications systems it is necessary to provide apparatus for modulating the output of these devices at very high frequencies. A number of schemes for modulating the amplitude of the maser beam have been described by workers in the art. In some instances, however, it is desirable to modulate the phase angle or frequency of light waves.

It is an object of this invention to modulate the frequency of the coherent monochromatic light output of optical masers in accordance with signal information.

A further object of this invention is the modulation of the light output of optical masers at microwave frequencies.

The above-mentioned and other objects of the invention are achieved in one illustrative embodiment thereof comprising a modulating medium having an energy level system characterized by first, second and third successively higher electron energy levels. The separation between the first and the third energy levels corresponds to an optical frequency near that of the light to be modulated, while the separation between the first and second energy levels corresponds to a frequency which is advantageously in the microwave range. The light beam to be modulated is directed into the medium. Means are provided for applying to the medium modulated microwave energy at the frequency corresponding to the difference between the first and second energy levels, thereby modulating the electron population of the first level and hence varying the refractive index of the medium in accordance with the signal information. As the electrical length of the light path in the medium is varied, so are the phase angle and frequency of the light beam emerging therefrom.

It is a feature of the invention that the light to be modulated has a frequency close to but distinct from that which corresponds to the separation between the first and the third energy levels. Preferably, the frequency corresponds to an extreme of the characteristic dispersion curve of the modulating medium, or to a region of the dispersion curve closely adjacent to the resonant band representing the width of the appropriate spectral line of the medium. Typically, dispersion curve has either a maximum or minimum value in such a region.

These and other objects and features of the invention will be better understood from the following more detailed description taken in conjunction with the accompanying drawing in which.

Figure 1:
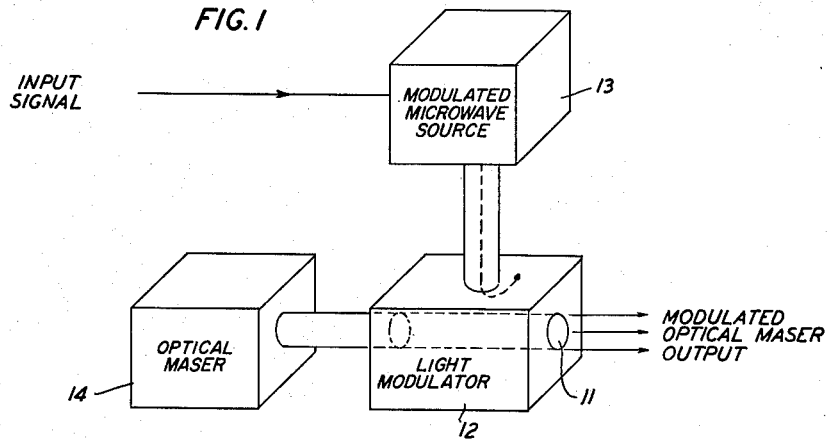
FIG. 1 depicts illustrative apparatus embodying the invention.
Figure 2:
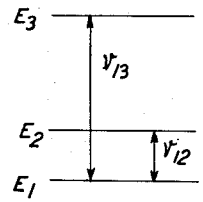
FIG. 2 represents the energy level system of the modulating medium.

Referring now to the drawing, there is shown in FIG. 1 an illustrative embodiment of the invention comprising a transparent modulating medium 11 of a material having an energy level system characterized by first, second and third successively higher electron energy levels. An energy level system suitable for use in the invention is represented schematically in FIG. 2. The frequency $\nu_{13}$ corresponding to the separation between energy levels $E_1$ and $E_3$ is in the optical frequency range, while $\nu_{12}$ is in the microwave range. Advantageously, $\nu_{13}$ differs by a small amount from the frequency of the light beam to be modulated. This relation is explained more fully hereinafter.

Associated with the medium 11, which is shown in the drawing as a rod shaped member, is apparatus for applying thereto modulated microwave energy of frequency $\nu_{12}$. In the illustrative embodiment depicted in FIG. 1 such apparatus takes the form of a cavity resonator 12 to which is connected a modulatable microwave source 13. The light beam to be modulated is directed from a source such as an optical maser 14 through the medium 11. Under the influence of the modulated microwave energy the refractive index and dielectric constant of the medium 11 are varied, thereby modulating the phase angle of the light emerging from the medium 11 in accordance with signal intelligence supplied to source 13.

The separation between energy levels $E_1$ and $E_3$ defines a spectral line of the modulating medium 11. When a majority of the electrons of the medium 11 are in an unexcited state, $\nu_{13}$ corresponds to an absorption line of the spectrum. However, it is well known that by "pumping" such a medium with wave energy of an appropriate frequency, the population distribution of electrons among the energy levels may be altered. When normal or unexcited conditions obtain the population of upper energy levels is smaller than that of lower levels. Under the influence of wave energy of the proper frequency, however, electrons absorb energy and are transferred to high energy levels. Thus pumping of the medium 11 by energy of frequency $\nu_{12}$ results in an increase of the electron population of the energy level $E_2$ and a corresponding decrease in the population of energy level $E_1$.

The transfer of electrons from level $E_1$ to level $E_2$ also produces a shift in the relative populations of levels $E_1$ and $E_3$. More particularly, it tends to bring the population of these two levels closer to numerical equality. As a result, the number of electrons available for excitation from level $E_1$ to level $E_3$ decreases, thereby decreasing the strength of the absorption line at the optical frequency $\nu_{13}$. Furthermore, since the dispersion characteristics of the modulating medium 11 are also dependent on the density of electrons available for interaction with the light beam, the magnitude of refractive index $n$ at any particular frequency is also decreased proportionately.

Figure 3:
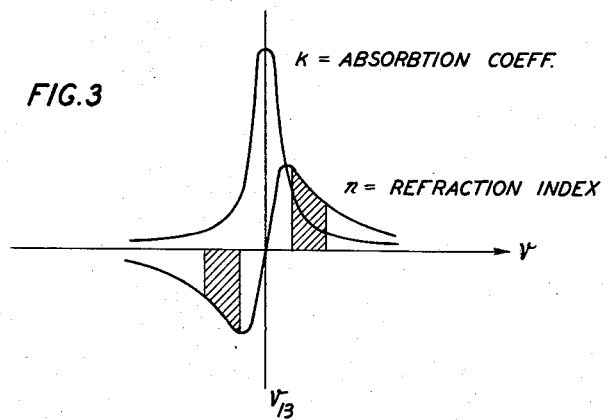
FIG. 3 is a plot of frequency versus the absorption coefficient and the refractive index of the modulating medium.

The absorption coefficient $k$ and the refractive index $n$ of the medium 11 are plotted as functions of frequency in FIG. 3. In view of the foregoing it can be seen from FIG. 3 that a light beam of frequency $\nu_{13}$ may be amplitude modulated by passing it through medium 11 while applying thereto modulated microwave energy at frequency $\nu_{12}$. A device of this type is disclosed in copending patent application Serial No. 128,161 of A. Yariv, filed July 31, 1961. Because the peak of the absorption curve coincides with the so-called region of anomalous dispersion, the phase angle of the light beam is but slightly affected when its frequency is equal to $\nu_{13}$. In accordance with the present invention, however, the frequency of the light beam to be modulated differs slightly from $\nu_{13}$. More specifically, the frequency of the light beam corresponds to a portion of the dispersion curve where the refractive index is normally at or near an absolute maximum, while the absorption coefficient is but a small fraction of its maximum. The frequency ranges preferred for operation of the invention are shown as shaded areas in FIG. 3. In these ranges modulation of the number of electrons available for interaction with the light beam produces a relatively slight amplitude modulation of the beam while simultaneously producing a relatively large modulation of its phase angle. The modulation frequency is limited only by the relaxation time between levels $E_2$ and $E_1$.

Light passing through medium 11 undergoes a phase shift of $$\Phi = \frac{\omega l}{c}\sqrt{\epsilon} \qquad (1)$$

radians where $l$ is the length of the path in the medium, $\omega$ is the radian frequency of the light, $\epsilon$ is the dielectric constant and $c$ is the velocity of light. A change in $\epsilon$ results in a change in $\Phi$:

$$\Delta\Phi = \frac{\omega l}{2c\sqrt{\epsilon}}\Delta\epsilon \qquad (2)$$

It can be shown that for ruby containing a 0.1% concentration of chromium $\Delta\epsilon \cong 3f$ where $f$ is the oscillator strength of the $R_1$ transition. At room temperature (290° K.) in ruby $f \cong 10^{-6}$, if $l=1$ cm. then $\Delta\Phi \cong 0.1$ radian.

Now if $\Delta\Phi$ is modulated at a radian frequency of $\Omega$ the field at the output end of the crystal is given by $$E = E_0 \sin[\omega_0 t + \Phi_m \sin \Omega t] \qquad (3)$$

where $\Phi_m = 0.1$ radian. $\Omega_{max}$ is approximately equal to $$\frac{2\pi}{T_{12}}$$

where $T_{12}$ is the relaxation time between levels $E_2 + E_1$. In ruby this is about $10^{-8}$ seconds. Thus $\Omega_{max} = 2\pi \times 10^8$ radians/sec. so that the modulation bandwidth is about $10^8$ cycles per second. It is to be noted that the above figures for phase modulation correspond to frequency modulation with a maximum deviation of about $10^7$ cycles per second.

A ruby modulating medium may be used to modulate the light output from a ruby optical maser by adjusting its energy level structure through the Stark effect or the Zeeman effect. Thus, a steady magnetic field may be employed to shift the resonant band corresponding to $\nu_{13}$ in the ruby modulating medium to a slightly different frequency, thereby establishing the required relation between the light to be modulated and the absorption and dispersion curves of the medium. In general, it will be found convenient to use as the modulating medium a sample of the substance forming the active medium of the optical maser source of the light to be modulated, although other substances may be used which have energy level structures which meet or can be adjusted to meet the condition specified herein. Magnetic or electric field producing means, which, for simplicity, have not been shown, may be arranged by those skilled in the are to bring about the required relation between the energy level structures.

While the invention is described herein with reference to a specific illustrative embodiment, many variations and modifications are possible and may be made by workers in the art without departing from its scope and spirit.

What is claimed is:

1. Apparatus for modulating a coherent monochromatic light beam comprising a transparent modulating medium characterized by first, second and third successively higher electron energy levels, said first and third levels having a separation corresponding to a frequency distinct from but close to that of the light to be modulated whereby the refractive index of said medium is characterized by an extreme at substantially the frequency of said light, said extreme being removed from the center of the absorption line corresponding to the separation of said first and third levels, said first and second levels having a separation corresponding to a frequency in the microwave range, means defining a light beam path through said medium, and means for varying the refractive index of said medium in accordance with signal information comprising means for applying to said medium modulated microwave energy having a frequency corresponding to the separation between said first and second energy levels.

2. Apparatus for modulating a coherent monochromatic light beam comprising a transparent modulating medium characterized by first, second and third successively higher electron energy levels, said first and third levels having a separation corresponding to a frequency in the optical range and said first and second levels having a separation corresponding to a frequency in the microwave range, said medium being further characterized by a dispersion curve having an extreme corresponding to a frequency near said optical frequency, means for producing a beam of coherent light wave energy having a frequency near the extreme of said dispersion curve and removed from the center of the absorption band corresponding to the separation between said first and third energy levels, means for directing said beam through said medium, and means for varying the refractive index of said medium in accordance with signal information comprising means for applying to said medium modulated microwave energy having a frequency corresponding to the separation between said first and second energy levels.

3. Apparatus as in claim 2 wherein said light beam producing means is a maser having an active medium of the same material as said modulating medium, and further including means for shifting the energy level structure of said modulating medium with respect to that of said active maser medium.

4. Apparatus as in claim 3 wherein said energy level shifting means comprises means for applying a steady magnetic field to said modulating medium.

5. Apparatus as in claim 3 wherein said energy level shifting means comprises means for applying a steady electric field to said modulating medium.

6. Apparatus as in claim 3 wherein said modulating medium comprises ruby.

References Cited in the file of this patent
UNITED STATES PATENTS
| | | |
|---|---|---|
| 2,707,235 | Townes | Apr. 26, 1955 |
| 2,929,922 | Schawlow et al. | Mar. 22, 1960 |

OTHER REFERENCES
A. E. Javitz, "Developments In Optical Masers," Electro-Technology, February 1961, pp. 9–11.